(No Model.)

J. M. DOTY.
TRUCK.

No. 285,588. Patented Sept. 25, 1883.

Witnesses:
W. C. Jirdinston.
A. J. Stewart.

Inventor:
James M. Doty
by Franck D. Johns
his Attorney.

N. PETERS, Photo-Lithographer, Washington, D. C.

UNITED STATES PATENT OFFICE.

JAMES M. DOTY, OF COLUMBUS, OHIO.

TRUCK.

SPECIFICATION forming part of Letters Patent No. 285,588, dated September 25, 1883.

Application filed June 20, 1883. (No model.)

*To all whom it may concern:*

Be it known that I, JAMES M. DOTY, a citizen of the United States of America, residing at Columbus, in the county of Franklin and State of Ohio, have invented certain new and useful Improvements in Trucks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, and in which—

Figure 1:
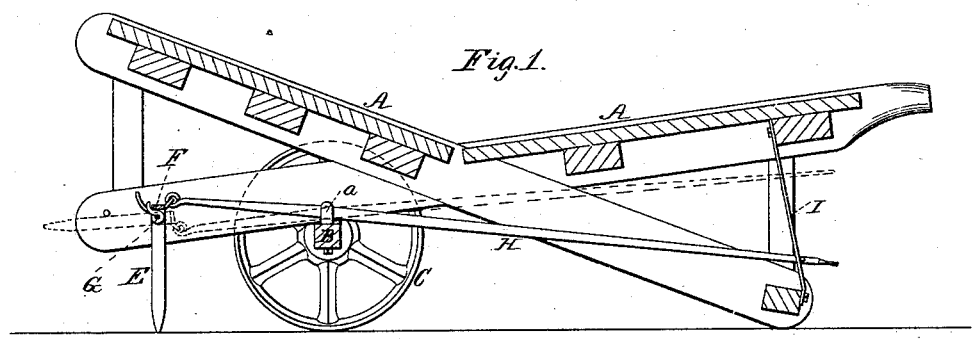
Figure 2:
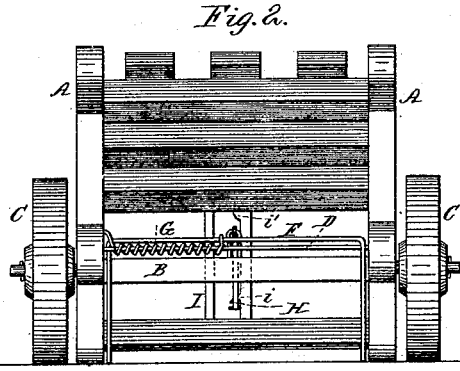
Figure 3:
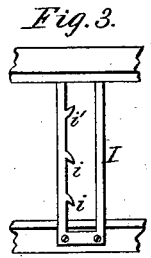
Figure 4:
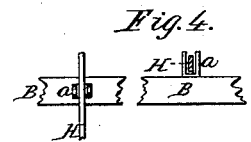

Figure 1 is a vertical longitudinal section; Fig. 2, an end view; Figs. 3 and 4, details.

My invention relates to certain improvements in baggage-trucks; and it consists in providing a truck with adjustable legs, which can be used to support the forward part of the truck when loading or unloading, and be drawn up and secured out of the way when said truck is in motion, the construction and arrangement of which I will now proceed to describe.

Referring to the drawings, similar letters of reference indicate like parts.

A is the truck-frame; B, the axle, fastened securely to said truck-frame; C, the wheels.

D is a rod extending from one side of the lower part of the truck to the other.

E E are adjustable legs, which are pivoted or swing on the rod D. Said legs are connected by the cross-bar F.

G is a spring bearing upon the top of the cross-bar F, and serves to force the same down and thus throw the legs E up out of the way, as shown in dotted lines, Fig. 1. If desired, two springs can be used, one on each side of the truck.

H is a lever pivoted at one end to the cross-bar F, and fulcrumed in the forked bearing $a$ on the axle B, said bearing having its sides high enough to prevent the lever from getting out of place.

I is an upright rod, having the downwardly-projecting notches or hooks $i$ and the upwardly-projecting notch $i'$, with which notches the rear end or handle of the lever engages. To adjust the legs to support the truck, the lever is forced down and hooked in one of the notches $i$, thus raising the cross-bar F and lowering the legs E, as shown in Fig. 1. When the lever is released from the notch or hook $i$, the spring forces the legs up to the position shown in dotted lines, Fig. 1. The notch $i'$ is used in case the spring should break. By hooking the lever in said notch the legs are held up out of the way. By the use of these adjustable legs I am enabled to provide a truck which will have a solid support for its entire length, and thus do away with the troublesome tilting experienced in ordinary trucks when loading and unloading; and when said adjustable legs or supports are drawn up out of the way they will not interfere with the movement of the truck.

Having thus fully described my invention, I claim as new and desire to secure by Letters Patent—

1. A truck having the adjustable legs E, in combination with the lever H, substantially as and for the purpose shown and described.

2. A truck having the adjustable legs E and cross-bar F, in combination with the spring G and lever H, substantially as shown and described.

3. The adjustable legs E, cross-bar F, and rod D, in combination with the spring G, lever H, and rod I, having the notches $i$ $i'$, substantially as shown and described.

In testimony whereof I affix my signature in presence of two witnesses.

JAMES M. DOTY.

Witnesses:
 EDMUND SMITH,
 R. W. CALDWELL.